E. G. DE LOE.
COIL SPRING VEHICLE TIRE.
APPLICATION FILED JULY 28, 1915.
1,171,507.
Patented Feb. 15, 1916.
2 SHEETS—SHEET 1.
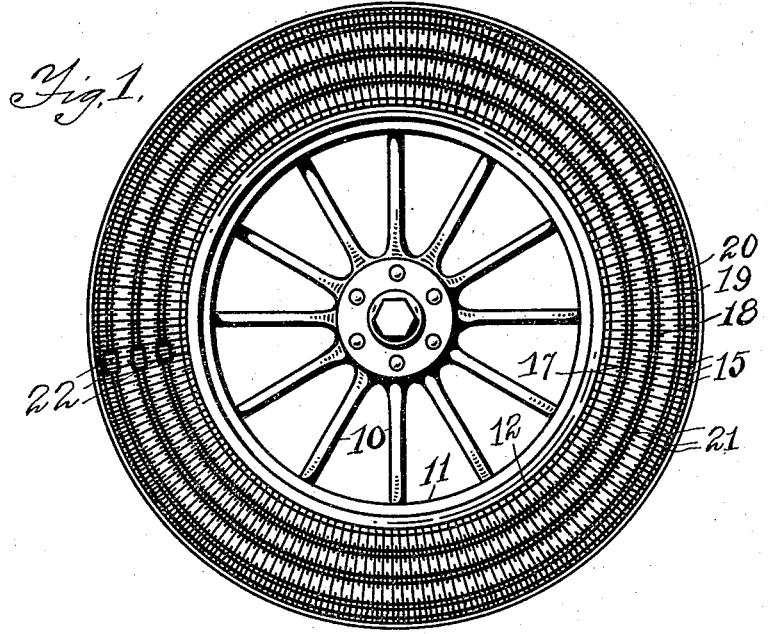
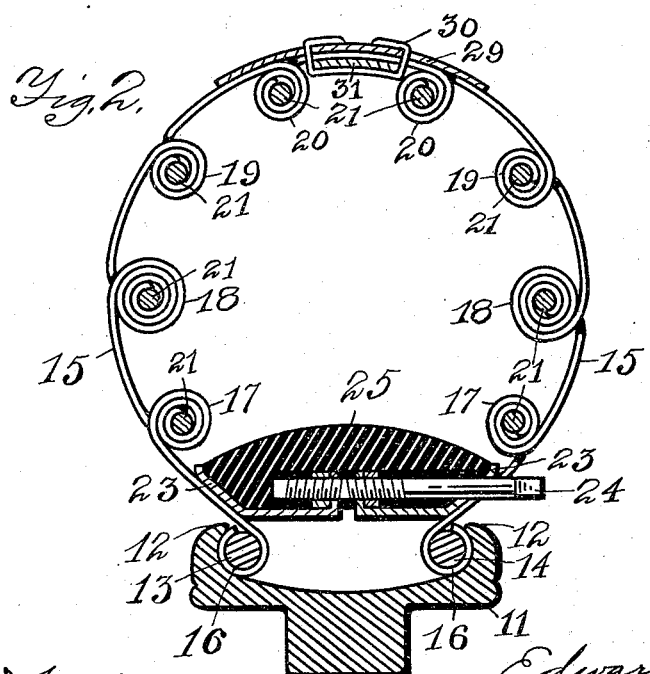
Witnesses
Harold Forsberg
H. A. Sandberg
Inventor
Edward G. De Loe
By S. Arthur Baldwin
Attorney
THE COLUMBIA PLANOGRAPH CO., WASHINGTON, D. C.

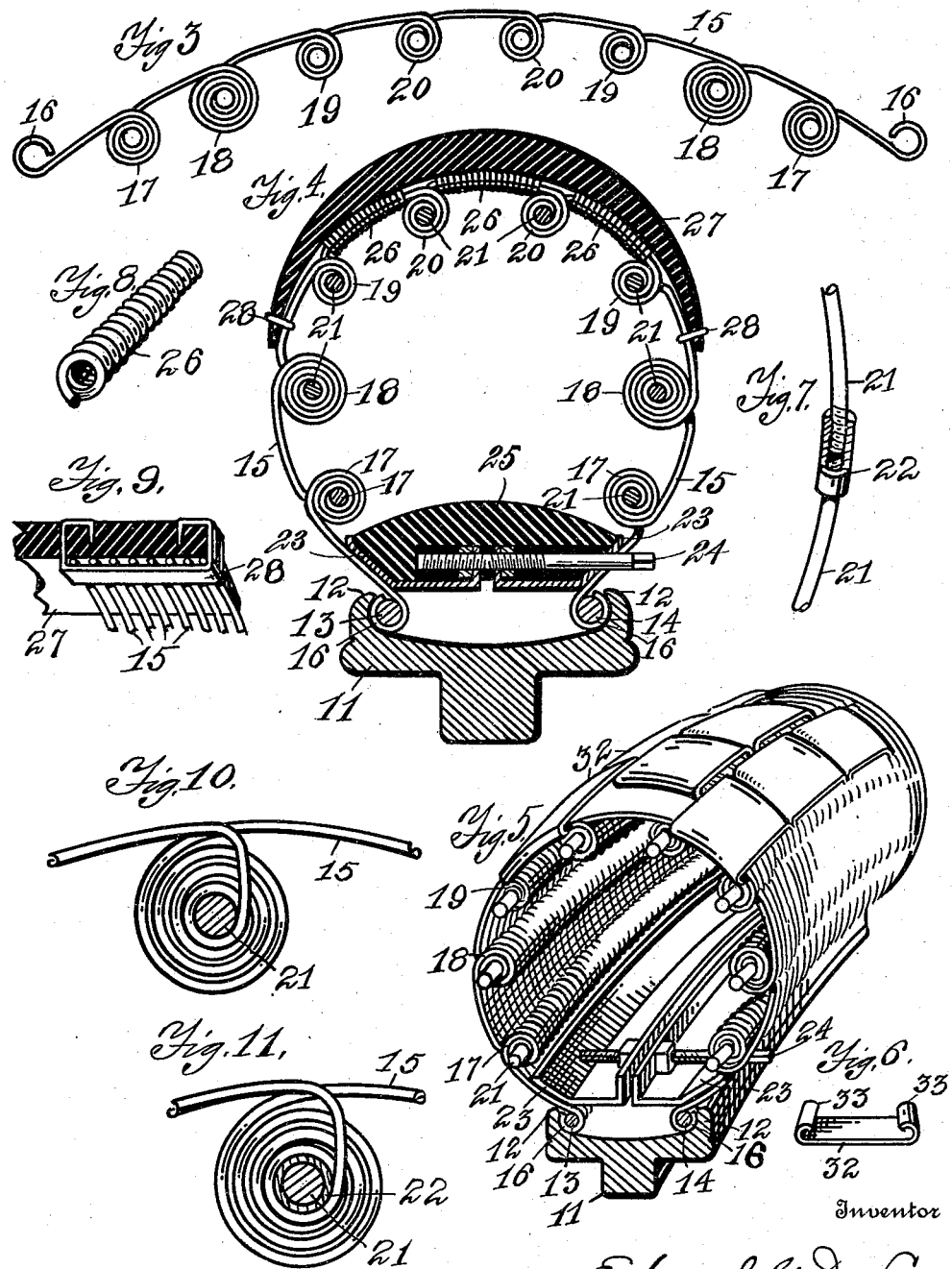

UNITED STATES PATENT OFFICE.

EDWARD G. DE LOE, OF JAMESTOWN, NEW YORK.

COIL-SPRING VEHICLE-TIRE.

1,171,507. Specification of Letters Patent. Patented Feb. 15, 1916.

Application filed July 28, 1915. Serial No. 42,294.

*To all whom it may concern:*

Be it known that I, EDWARD G. DE LOE, a citizen of the United States, residing at the city of Jamestown, in the county of Chautauqua and State of New York, have invented certain new and useful Improvements in Coil-Spring Vehicle-Tires, of which the following, taken in connection with the accompanying drawings, is a specification.

The invention relates to spring tires for vehicles, and the object of the improvement is to provide a simple and durable construction of spring cross wires having rows of spaced spiral coils or convolutes therein with spring forming hoops running through the centers of said coils around the tire, and tension mechanism for said cross wires, said spring tire being capable of attachment and detachment from the wheel rim; and the invention consists in the novel features and combinations hereinafter set forth and claimed.

In the drawings, Figure 1 is an elevation of a vehicle wheel having my improved spring tire thereon. Fig. 2 is a crosswise sectional view of the tire and wheel rim showing the construction of the same with the tension mechanism and the manner of attachment to the wheel rim. Fig. 3 is an elevation of one of the cross wires of the tire showing a plurality of spaced spiral coils in said wire. Fig. 4 is a crosswise sectional view of the tire and wheel rim with a rubber tread attached to said tire. Fig. 5 is a perspective view of a portion of the tire and wheel rim with a broken joint flexible sheet steel tread for said tire; and Fig. 6 is a perspective view of one of the sheet steel plates for covering or armoring the tread of the spring tire. Fig. 7 is an elevation partly in section of the coupling for the ends of the spring forming hoops for holding the spirally coiled cross wires showing the manner of forming the joint. Fig. 8 is a perspective view of one of the spiral coils which are slipped onto the spaced spirally flat coiled cross wires between said spirals to strengthen the tread and may be used with or without other treads, like the sheet steel or rubber treads shown. Fig. 9 is a perspective view of one of the fasteners for the edges of the rubber treads showing the cross wires extending through said fasteners beneath a section of the rubber. Fig. 10 is an enlarged view of one of the spiral coils in the spring cross wires with the spring forming hoop in section extending therethrough; and Fig. 11 is a similar view at the joint or coupling in said spring hoop showing the enlarged opening through the spring coil for said joint.

Like numerals of reference refer to corresponding parts in the several views.

The numeral 10 designates a vehicle wheel which has a rim 11 with inturned flanged edges 12 at each side to detachably receive therewithin the hoops 13 and 14.

The spring wire tire consists of a series of spring cross wires 15 extending around the wheel rim 11. Each of the spring cross wires 15 are continuous, that is, they extend from one attaching hoop 14 at one side to the other loop 13 on the opposite side of the rim 11, preferably having each of the ends turned in an eye or ring 16 to receive therethrough the attaching hoop 13 or 14. Each spring cross wire 15 is given added resiliency by means of the spaced integral flat spiral coils 17, 18, 19 and 20 which are turned in said wire 15 at similarly spaced distances along said wire throughout the series so as to give alinement to said coils. The spring wire is turned in said flat spiral coils and each coil has the wire continued from the central convolution slightly to one side sufficient to escape the adjacent convolution in a curving bend which brings it into alinement with the contour of the tire as formed by said wires 15, as clearly shown in Figs. 10 and 11. This arrangement of the flat spiral coils allows each of said coils to freely expand or contract, the spiral coils being spaced slightly from one another to permit the opening and closing of the coil according to the bending pressure upon each spring cross wire 15.

The number of convolutions of the spring wire 15 in each flat spiral is according to the resiliency required by the position of said spiral in its relation to the periphery of the spring tire, thus the spiral 18 central of each side should usually have the largest number of convolutions, or about four, as shown in Figs. 10 and 11, while the coils 20 on the face of the tread should be less resilient and do not need but two. It is apparent that the side of the spirals may be graduated according to the resiliency desired. The spiral coils are formed and held firmly in line so as to permit closing and opening under pressure by different sized spring steel hoops 21 which extend around the tire through the centers of the spirals, one to each row of coils 17, 18, 19 and 20. The forming hoop 21 is slipped through the center of the coils and the ends are threaded and united by a sleeve coupling 22 having right and left threads. The openings in that portion of the spiral coils where the couplings 22 are placed are enlarged, as shown in Fig. 11, so that there is room for the sleeve 22. The cross wires 15 are preferably placed side by side or abutting against one another on the wire forming hoops 21, and it is apparent that the forming hoops 21 may be made as to size so as to draw or shape the tire into the preferred oval form when said hoops 21 are united by the couplings 22. It is then easy to spring the attached hoops 13 and 14 within the rim 11.

In order to provide a tension for the spring cross wires 15 as well as to strengthen and stiffen the same in their hold upon the rim 11 so as to overcome liability of sidewise bending of the spring tire, a pair of metal hoops 23 are inserted within the spring wires before the attachment of the same, which hoops extend entirely around the rim 11 and are preferably made in the channel form with outturned inner flanges which are spaced a distance apart when their outer flanges rest against the spring cross wires 15. A series of adjusting bolts 24 are provided which extend through the outer flange at one side and through the inner spaced flanges having nuts at each side of said flanges and right and left threads on said bolts 24 and nuts, which arrangement permits the adjustment of the two channel hoops 23 as to one another and as to the spring cross wires 15 so that any desired tension may be given to said spring cross wires at any portion of the tire by the turning of one or more of the screw bolts 24. It is also apparent that the hoops 23 will hold the hoops 13 and 14 firmly within the flanges 12 when the tension hoops 23 are pressed out against the cross wires 15 by the spreading of said hoops by the bolts 24. A rubber cushion 25 may be placed within the channel hoops 23, as shown in Fig. 2, against which the spirals of the cross wires 15 strike should the pressure upon the spring tire be so great as to cause the complete depression of the outer portion of the tread against said cushion.

One of the simplest ways of providing a strengthened tread for the spring tire is to slip a series of spiral coils 26 upon the wire 15 between the outer spirals 19 and 20 when coiling the same, and the cross wires 15 may be used with or without the coils 26 when other protectors are used over the tread of the tire.

A rubber tread 27, as shown in Fig. 4, may be attached to the spring cross wires 15 by means of steel fasteners or clasps 28 at each side. A series of the clasps being used around each edge of the tread 27, each clasp or fastener 28 engaging a number of the cross wires 15. The clasps 28 are preferably placed between two of the spirals so that they may work back and forth, thereby adapting the tread 27 to the spring of the tire. For certain purposes it is desirable to use a stronger tread. A continuous sheet steel strip 29 may be attached as shown in Fig. 2 by means of a clasp 30 at spaced distances. A plate 31 is provided on the inner side of the cross wires 15 around the tire, which plate 31 is engaged within the clasps or fasteners 30, which thereby binds the two strips 29 and 31 firmly against the outer and inner faces of the spring wires 15 and form a strong and durable tread. The sheet steel may be made in sections as shown at 32 in Fig. 5 having inwardly curved ends 33 to engage a plurality of the cross wires 15. When so used it is preferable to break joints between the different series of plates 32 thereby greatly strengthening the cross wires 15 and forming a flexible steel tread of great strength and durability.

In assembling the parts of the spring tire the cross wires 15 are first each turned in the flat spaced spiral coils and are then attached side by side to the hoops 13 and 14 for attachment within the flanged edges 12 of the wheel rim 11. The different sized forming hoops 21 are then inserted through their respective rows of spirals 17, 18, 19 and 20 and the ends of said hoops are united preferably by the sleeve couplings 22 in that part of the cross wires 15 in which the central openings in the flat spiral coils are enlarged to receive said sleeve couplings. The different sized forming hoops 21 shape the tire as desired and hold the cross wires 15 in line. The adjustable tension hoops 23 are then inserted in the tire and it is ready for shipment or attachment to the wheel rim 11. The attachment is simple, it only being necessary to spring the two hoops 13 and 14 into the flanges 12 and then screw up the bolts 24 thereby spreading the rings 23. This arrangement holds the combined wire and hoop fabric of the tire firmly upon the wheel rim and against sidewise bending as in turning corners and similar strains.

When it is desired to strengthen the tread by means of the spiral coils 26 they are slipped onto the tread portion of said cross wires when the spirals 19 and 20 are coiled. If an outer tread is desired upon the tire whether of rubber or steel, it is attached, as hereinbefore described, before the attachment of the tire to the wheel rim. It is apparent that the whole structure forms a wire and hoop fabric spring tire having its resiliency at each side where the bending of the tire is necessary in order to give the required resiliency, yet may have said resiliency graduated according to the size and spring of the cross wires to support the load, and is simple and durable in its construction. The attaching hoops 13 and 14 may be inserted through the eyes in the turned ends of the cross wires 15 and the ends of the cleft hoops 13 and 14 each coupled the same as the forming hoops 21, or they may be welded together in hoop form and the wires bent around the same without departing from my invention.

I claim as new:

1. A vehicle tire comprising spring cross wires each turned in a plurality of integral flat spaced spiral coils, means for holding said spring cross wires in line to form a tire, and means for attaching said tire to a wheel rim.

2. A vehicle tire comprising spring cross wires, a plurality of flat spaced spiral coils turned in each of said cross wires, hoops inserted through the centers of said spiral coils to hold said cross wires in line, and means for attaching the tire to a wheel rim.

3. A vehicle tire comprising spring cross wires, a plurality of flat spaced spiral coils turned in each of said cross wires, said spiral coils graduated as to the number of convolutions to give greater resiliency to the sides of said tire than to the tread, different sized hoops inserted through the centers of said spiral coils to hold said cross wires in form, and means for attaching the tire to a wheel rim.

4. A vehicle tire comprising a plurality of spring cross wires placed side by side around said tire, each of said spring cross wires turned in a plurality of flat spaced spiral coils having openings through their centers and in line with one another, different sized hoops inserted through said spiral coils to form said cross wires in the shape of a tire, and hoops on the ends of said cross wires for attachment to a wheel rim.

5. A vehicle tire comprising spring cross wires, a plurality of spiral coils in each of said wires, hoops inserted through said spiral coils to hold said spring cross wires in line, a hoop attached to each end of said cross wires for attaching to a wheel rim, two spaced hoops within said tire to bear against the inner sides of said cross wires, and spaced means extending out between said cross wires for spreading said spaced hoops to give tension to said cross wires from outside the tire.

6. A vehicle tire comprising spring cross wires, a plurality of spiral coils in each of said wires, hoops inserted through said spiral coils to hold said spring cross wires in line, a hoop attached to each end of said cross wires for attaching to a wheel rim, two spaced channeled hoops within said tire to bear against the inner sides of said cross wires, and a plurality of spaced screws with squared ends extending out between said spring cross wires and having right and left threads engaging similar threads on said hoops to adjust said hoops in relation to said cross wires by the turning of said screws from outside the tire.

7. A vehicle tire comprising a plurality of spring cross wires placed side by side around said tire, said spring cross wires turned in a plurality of flat spaced spiral coils having openings through their centers and in line with one another, different sized hoops inserted through said spiral coils to form said cross wires in oval shape, hoops on the ends of said cross wires for attachment to a wheel rim, and a rubber cushion between the ends of said cross wires within said tire around said wheel rim.

8. A vehicle tire comprising spring cross wires, a plurality of flat spiral coils in each of said cross wires, said flat spiral coils similarly graduated as to the number of convolutions from the center of said spring cross wires toward each end to give a similar resiliency to the opposite sides of the tire, said flat spiral coils having openings through the centers thereof, different sized hoops inserted through the centers of said coils and means for coupling the ends of each of said hoops, and means for attaching the tire to a wheel rim.

9. A vehicle tire comprising spring cross wires, a plurality of flat spiral coils in each of said wires, hoops inserted through said spiral coils to hold said spring cross wires in line, a hoop attached to each end of said cross wires for attaching to a wheel rim, means bearing against the opposite inner sides near the ends of said cross wires adjacent to the wheel rim to press said cross wires apart and give tension thereto, and a rubber cushion within said tire adjacent to said tension means and extending around said wheel rim.

10. A vehicle tire comprising spring cross wires, a plurality of spaced flat spiral coils in each of said wires having openings therethrough, an attaching hoop on each end of said cross wires for attachment to a wheel rim, different sized forming hoops inserted through the openings in said spiral coils, and means for connecting the ends of each of said hoops.

11. A vehicle tire comprising spring cross wires, a plurality of spaced flat spiral coils in each of said wires having openings therethrough, an attaching hoop on each end of said cross wires for attachment to a wheel rim, different sized forming hoops inserted through the openings in said spiral coils, sleeve couplings for connecting the ends of said hoops, said flat spiral coils having enlarged openings to receive said sleeve couplings.

12. A vehicle tire comprising spring cross wires, a plurality of spaced flat spiral coils in each of said wires, close wire coils placed on said cross wires in the tread portion between said spaced flat spiral coils to strengthen said tread, hoops attached to said cross wires one to each end for attachment to a wheel rim, and different sized hoops inserted through said spiral coils to hold said spring cross wires in tire form.

13. A vehicle tire comprising spring cross wires, a plurality of spaced spring spiral coils in each of said wires, different sized hoops inserted through said spiral coils to hold said spring cross wires in tire form, hoops attached to a wheel rim, a rubber tread covering extending around the tire, and a plurality of spaced metal clasps each engaging a plurality of said cross wires and clenched on said rubber tread to hold the same.

In testimony whereof I have affixed my signature in the presence of two witnesses.

EDWARD G. DE LOE.

Witnesses:
H. A. SANDBERG,
HAROLD FOSBERG.

Copies of this patent may be obtained for five cents each, by addressing the "Commissioner of Patents, Washington, D. C."